United States Patent Office 3,309,901
Patented Mar. 21, 1967

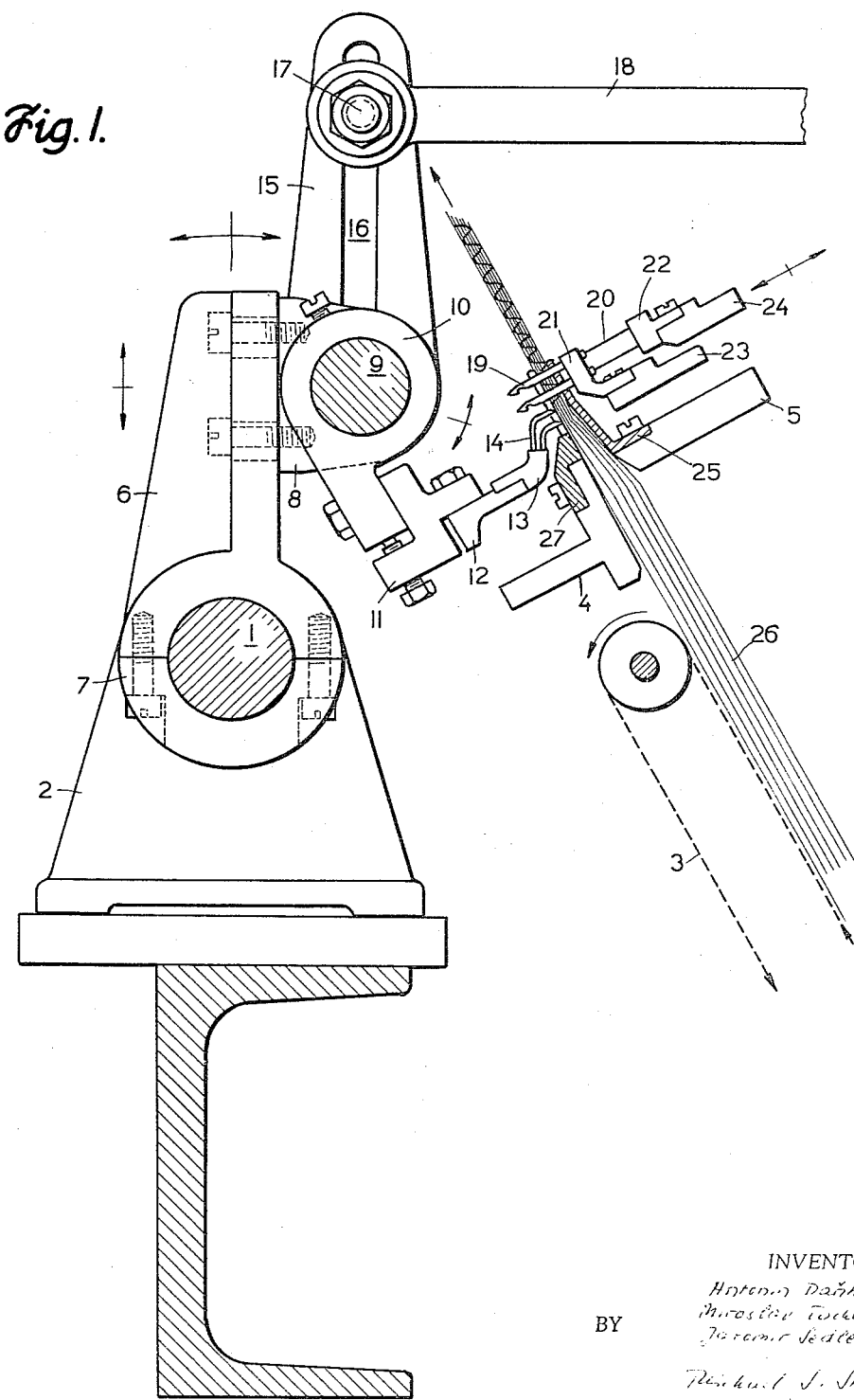

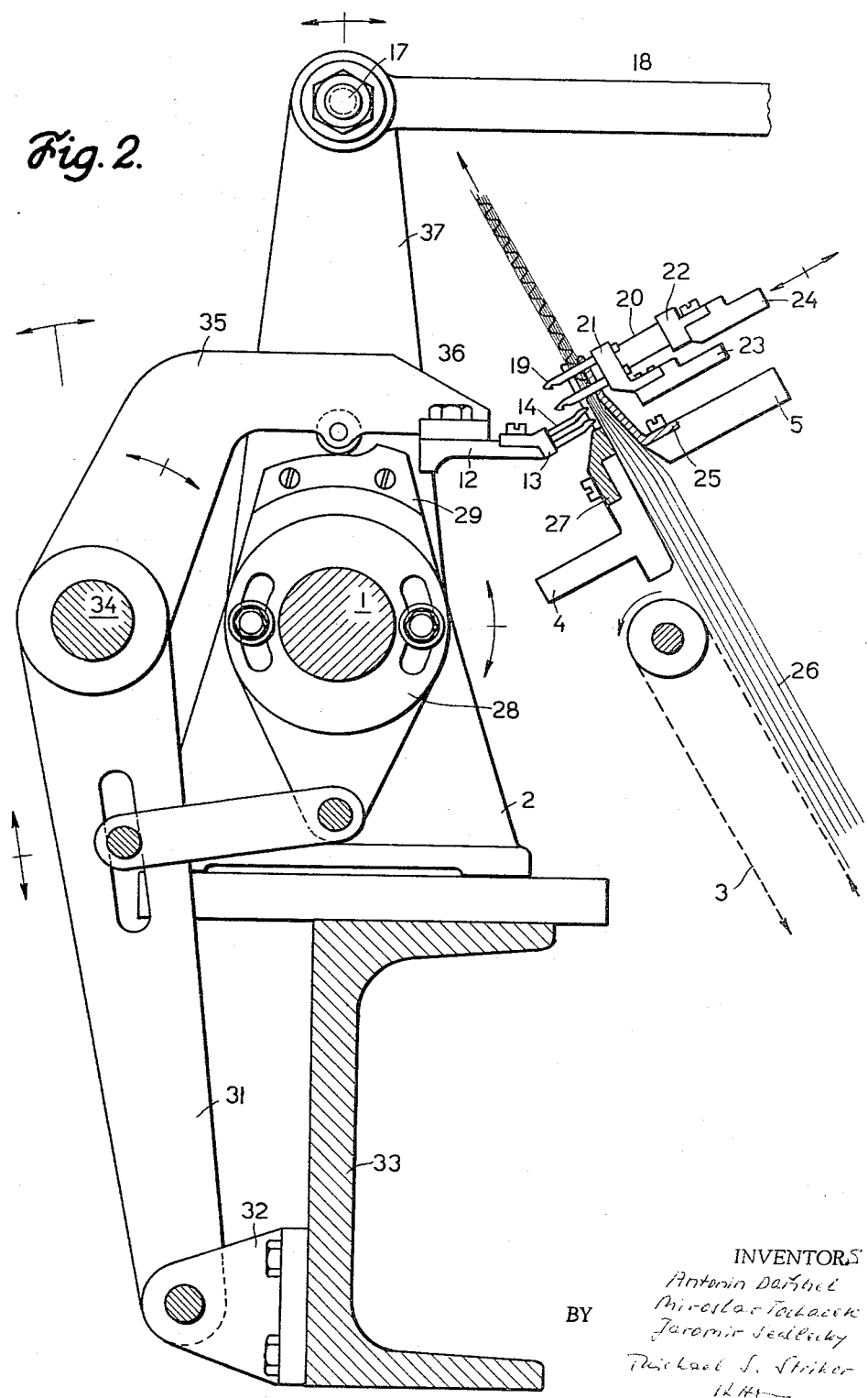

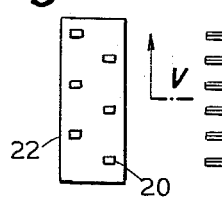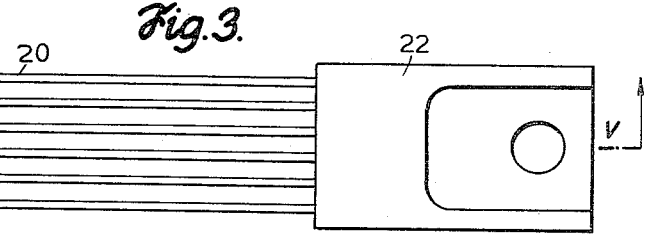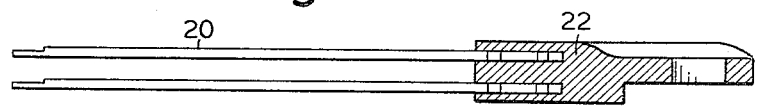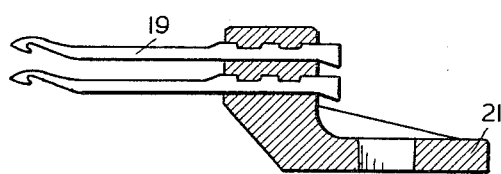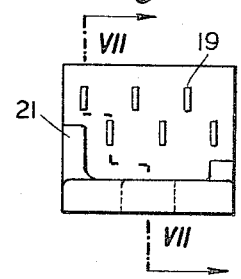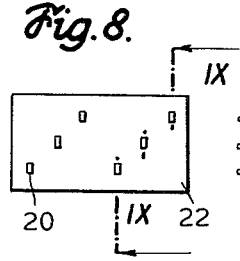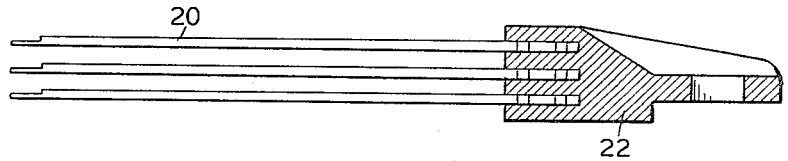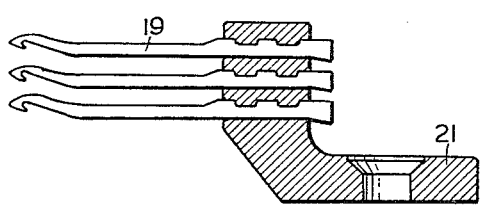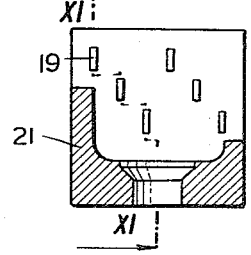

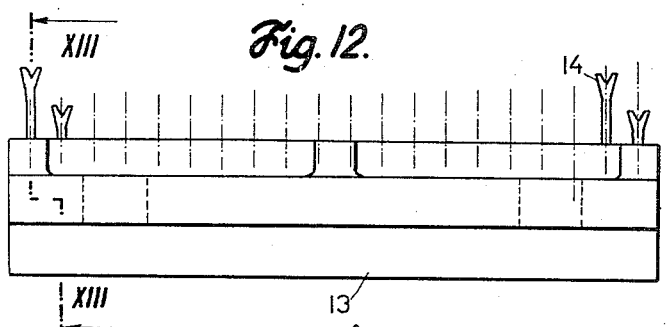
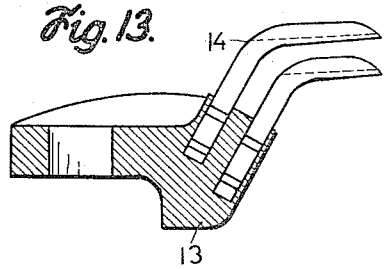
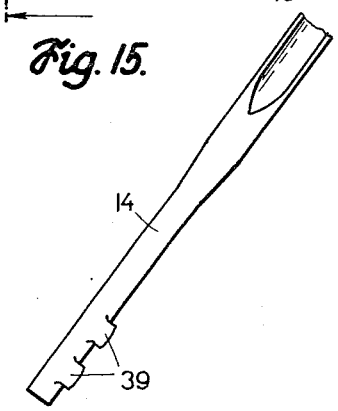
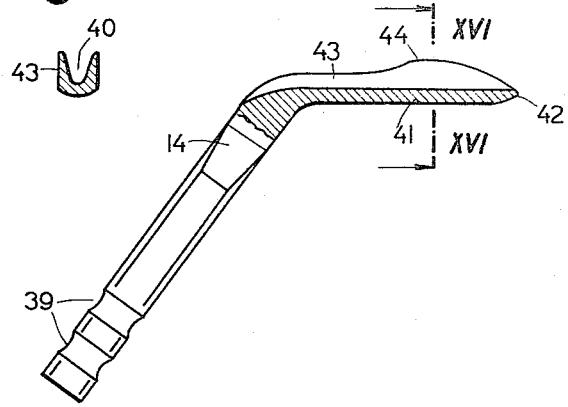
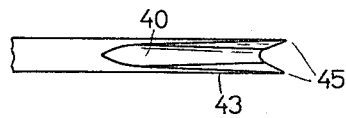
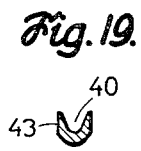
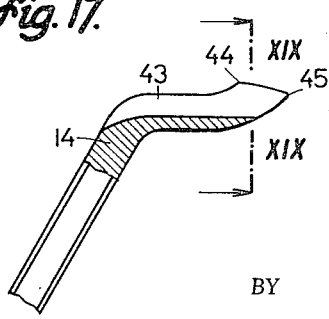

3,309,901
APPARATUS FOR REINFORCING A FIBROUS MATERIAL
Antonín Daňhel and Miroslav Tocháček, Brno, and Jaromír Sedlecký, Prague, Czechoslovakia, assignors to Elitex, Sdruzeni Podniku Textilniho Strojirenstvi, Liberec, Czechoslovakia
Continuation of application Ser. No. 357,980, Apr. 7, 1964. This application Feb. 28, 1966, Ser. No. 534,582
Claims priority, application Czechoslovakia, Apr. 12, 1963, 2,145/63
20 Claims. (Cl. 66—85)

The present invention is a continuation application of our copending application Ser. No. 357,980, filed Apr. 7, 1964, now abandoned.

The present invention relates to an apparatus for reinforcing fibrous material, particularly sheet materials consisting of a fleece, and more particularly to apparatus for forming of parts or fibers of the material, chain loops passing through the material and reinforcing the same.

Interlacing and quilting machines are known by which a fibrous material is stitched by threads knitted in chain loops, provided with warp threads and weft threads and reinforced by threads passing through the sheet material.

The known interlacing machines use special laying devices and supply regulators for warp threads which are unreliable at high working speeds, causing thread breakage unless very high quality threads or yarns are used. Furthermore, complicated stop motions for stopping the machine in the case of warp thread breakage are required, and the threading of the thread into the needles is slow and not completely reliable. Other disadvantages of known interlacing machines for reinforcing fibrous sheet material with threads are that they cannot be operated at high speed, have a comparatively low output, and require careful attendance.

It is one object of the invention to overcome these disadvantages of interlacing machines for reinforcing fibrous material, and to provide an apparatus for reinforcing a fibrous material by fibers of the material itself.

Another object of the invention is to provide means for taking fibrous parts of the material, and for placing such parts into needles which drive the fibrous parts through the material so that the same is reinforced.

Another object of the invention is to supply fibers of the material to the open hook of latch needles piercing the material, and to operate the needles while transporting the material so that chain loops passing through and binding portions of the material are formed of the fibers of the material.

The apparatus of the invention can be constructed as an attachment to a standard interlacing and quilting machine in which event the thread supply means of the same are not used. The machine may be operated without the attachment for warp knitting threads, or with the attachment for reinforcing fibrous sheet material in accordance with the invention, using the needles and the conveyor of the standard machine as well as the let-off and take-up devices for the material.

A preferred embodiment of the invention comprises supporting means for supporting a fibrous material, such as a sheet of fleece; sinker means operable for engaging and displacing parts of the material, such as fibers of the fleece; and needle means operable for passing into and out of the material for receiving fibers from the sinker means and for driving or drawing the fibers through the material, preferably forming chain loops which reinforce the material.

The needle means comprise at least one, and preferably several offset rows of needles, and the sinkers are arranged in corresponding rows so that each sinker cooperates with a needle.

Operating means are provided for moving the sinkers first into the material to engage parts of the same, and for then moving the sinkers into the region of the corresponding needles for supplying the parts of the material, such as fibers, to the hooks of the needles. The material is moved by transporting means along a path, and the operating means move the sinkers in a circular or composite motion toward the path and the material and then in the direction of the path toward the needles.

Preferably, the sinkers have a groove for receiving part or the entire hook of the corresponding needle, and the groove of each sinker is bounded by a pair of walls having pointed tips for penetrating into the fibrous material, and lugs for guiding the engaged fibers into the hook of the corresponding needle.

The apparatus of the invention produces a reinforced fibrous material bound and reinforced by its own fibers so that binding threads can be omitted. The produced material is inexpensive, and the manufacture is more economical due to the reliability, simplicity, high efficiency and great output of the apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary side view, partially in vertical section, illustrating an apparatus according to one embodiment of the invention;

FIG. 2 is a fragmentary side view, partially in section, illustrating another embodiment of the apparatus;

FIG. 3 is a top view of a holder for needle latches;

FIG. 4 is a front view of the holder of FIG. 3;

FIG. 5 is a sectional view taken on line V—V in FIG. 3;

FIG. 6 is a rear view of a holder for the hook portions of the needles;

FIG. 7 is a sectional view taken on line VII—VII in FIG. 6;

FIG. 8 is a front view of a modified holder for needle latches;

FIG. 9 is a sectional view taken on line IX—IX in FIG. 8;

FIG. 10 is a rear view, partially in section, illustrating a holder for needle hook portions used with the latches of FIG. 9;

FIG. 11 is a sectional view taken on line XI—XI in FIG. 10;

FIG. 12 is a fragmentary rear view of a holder with sinkers;

FIG. 13 is a sectional view taken on line XIII—XIII in FIG. 12;

FIG. 14 is a side elevation, partially in section, illustrating a sinker on an enlarged scale;

FIG. 15 is a fragmentary plan view of the sinker;

FIG. 16 is a cross-sectional view taken on line XVI—XVI in FIG. 14;

FIG. 17 is a fragmentary side elevation, partially in section, illustrating a modified construction of a sinker;

FIG. 18 is a plan view of the sinker of FIG. 17; and

FIG. 19 is a cross sectional view taken on line XIX—XIX in FIG. 17.

The embodiments of the apparatus illustrated in FIGS. 1 and 2 are constructed as attachments to the quilting machine disclosed in the British Patent No. 878,248. A shaft 1 which is normally used for operating thread guides applying a thread to the needles of the machine, is not used for this purpose. Shaft 1 is mounted in bearing brackets 2 on a base 33. Other parts of the known quilting machine are the closing table 4, the knock-over table 5, the drive means, not shown, for the needles 19, 20 which may be constructed in accordance with the U.S. Patent 3,079,778, and a take-up roll, not shown, for winding up the finished product.

In the embodiment of FIG. 1, the normally turnable shaft 1 is blocked against rotation, and carries brackets 6 having divided hubs 7 which are clamped to shaft 1 so that brackets 6 are angularly adjustable. Bearings 10 are secured by screws to brackets 6 and support a shaft 9 for angular movement. The ends of shafts 9 have arms 15 with radial slots 16 in which pivot means 17 connected to links 18 are adjustably mounted. The other ends of links 18 are connected to eccentric cams on a control shaft, not shown, so that shaft 9 is oscillated angular distances determined by the effective radius of pivot means 17 after adjustment in slot 16. Bearing members 10 have projections on which adjusting means 11 are mounted whose exact position is determined by the turning of adjustment screws. A sinker bar or bed 12 is secured to a projection of the adjusting means 11, and carries holders 13 for groups of pressing sinkers 14.

Transporting conveyor means 3 transport a web or sheet of a fibrous material, such as a fleece along an oblique path so that the material enters between a closing table 4 and a knock-over table 5, the latter being provided with spaced knock-over bits 25 which gradually compress the transported material so that the same is flat in the region of the hook portions 19 of needles which also include latch portions 20. Hook portions 19 are mounted on holder means 21, and latch portions 20 are mounted on holder means 22 carried by a latch bed 24, while holder 21 is carried by needle bed 23.

Operating means of the type disclosed in the U.S. Patent 3,079,778 actuate the hook portions 19 and the latch portions 20 in a predetermined sequence so that a hook portion 19 moves from one side of the material to the other, penetrating the same. The hook portions 19 in the position of FIG. 1 are spaced from the sinkers 14 along the path of movement of sheet material 26. The knock-over bits 25 and the closing bits 27 are spaced to permit passage of the needles, and closing bits 27 also permit passage of sinkers 14 into the material.

The needles and sinkers are arranged on the respective holders in parallel rows staggered and offset to each other, as will be described hereinafter in greater detail.

In the embodiment of FIG. 1 holder means 13 with sinkers 14 move along a circular path whose center coincides with the axis of shaft 9 so that the points of the sinkers first penetrate into the fibrous material 26, and continue their movement into the region of the hooks of the hook portions 19 which in this moment are opened by the latch portions 20 so that parts of the material, such as fibers, can be placed in the hooks and drawn through the material during the return stroke of the needles from the left to the right as viewed in FIG. 1. In this manner each needle 19, 20 forms during movement of the material passing through the thickness of the sheet material. The shape and spacing of the closing bits 27 depends on the arrangement of sinkers 14 which are arranged in parallel rows offset to each other in the same pattern as the needles 19, 20. The needles are reciprocated in a plane which is substantially perpendicular to the path along which the sheet material is guided by tables 4 and 5 and transported by conveyor means 3, and the sinkers 14 are located below this plane.

FIG. 2 illustrates another embodiment of the invention in which shaft 1 is mounted in bearing brackets 2 for angular oscillatory movement. A link 18 is connected by a pivot means 17 to an arm 37 fixed to shaft 1 so that shaft 1 can be angularly oscillated when link 18 is operated by drive means, not shown. Sleeves 28 are mounted on shaft 1 and have part-circular slots in which screws threaded into bearing brackets 2 are located so that the sleeves can be angularly displaced about shaft 1 and then secured in adjusted positions. Sleeves 28 have downwardly projecting arms pivotally connected to links 30 carrying pins located in slots of a lever 31 which is mounted for rocking movement on a bearing bracket 32 on base 33. The upper end of lever 31 carries a pivot 34 on which an angular cam follower lever 35 is mounted. A roller on cam follower lever 35 cooperates with a cam track on a cam 29 secured to sleeve 28. Cam follower 35 carry the bed or bar 12 on which holders 13 of sinkers 14 are mounted, as described with reference to FIG. 1.

When shaft 1 is angularly oscillated, lever means 31, 35 are rocked about the axis of bearing brackets 32 so that sinker bed 12, holder means 13 and sinkers 14 move in a substantially horizontal movement. However, at the same time, roller 36 on cam follower lever 35 moves along the cam tracks so that the cam follower and thereby sinker bed 12 and the sinkers are raised near the end of the horizontal movement towards the sheet material. Consequently, sinkers 14 first penetrate into the material 26, and are then raised to carry fibers of the material into the region of the open hooks of the hook portions 19, which are then closed and withdrawn in return strokes through the sheet material, whereupon the old loop on the needles is knocked over by knock-over bits 25, and a new loop is formed of the fibers drawn by the needles through the material from the left to the right as viewed in the drawings. In this manner, chain loops reinforcing the material and binding portions of the same are formed of the fibers of the material itself, without any additional threads.

The construction and operation of sinkers 14 and needles 19, 20 is the same in both embodiments of the invention, the only difference being that in the embodiment of FIG. 1, the sinkers move along a circular path, and in the embodiment of FIG. 2 the sinkers move about a noncircular path in a composite movement.

One embodiment of a needle arrangement is illustrated in FIGS. 3 to 7. FIGS. 6 and 7 illustrate holder means 21 for the hook portions 19 of the needles. The hook portions 19 are arranged in two parallel rows staggered and offset relative to each other. As shown in FIGS. 3 to 5 the latch portions 20 are arranged in two corresponding rows in holder means 22, staggered and offset in the same pattern as the hook portions 19. During the operation, the latch portions 20 pass through channels, not shown, in hook portions 19 between a position opening the hook of the hook portion and a position closing the same. The leading ends of the latch portions 20 are recessed corresponding to the hooks of the hook portions 19.

The spacing between the needles and the distance between the rows of needles may be different, and depend on the required spacing and density of the stitches depending on the fiber distribution in the processed material 26. For certain kinds of fibrous materials, or depending on the intended use of the products, a greater number of rows of needles may be provided. FIGS. 8 to 11 illustrate a modified construction in which holder means 21 carry three parallel rows of staggered hook portions 19, and holder means 22 carry three rows of latch portions 20 staggered and disposed in the same pattern as the hook portions 19.

Since each sinker 14 cooperates with a needle 19, 12, sinkers 14 must be arranged in the same pattern as the corresponding needles. FIGS. 12 and 13 illustrate holder means 13 for two rows of staggered and offset sinkers 14, arranged in the same pattern as the needles of the embodiment of FIGS. 3 to 7. If the needles are arranged as described with reference to FIGS. 8 to 11, three rows of staggered sinkers must be provided.

FIGS. 14 to 16 illustrate a sinker 14 which has a shank 38 whose end is provided with projections and recesses 39 for securing the sinker in holder means 13. Sinker 14 is angular and has an engaging portion with a bottom wall 41 and to lateral walls 43 forming a groove 40 open at both ends. The width of groove 40, best seen in FIG. 16, corresponds to the thickness of the hook of the corresponding needle hook portion 19, and the depth is between one quarter of the height and the entire height of the hook so that the opening in the hook is at least partly embraced by the side walls 43 in the operative position of the sinkers. Side walls 43 are formed with projecting lugs 44 which have guide faces for engaging the fibers of the material into which the pointed tip 42 penetrates during the first part of the sinker movement. During the second part, lugs 44 urge the engaged fibers into the open hooks of the respective needle hook portions 19.

While the sinker of FIG. 14 has only one pointed end 42, the modified sinker construction illustrated in FIGS. 17 to 19 has side walls 43 which have pointed projecting tips 45 projecting beyond the end of groove 40 and forming two pointed prongs which are particularly suitable for penetrating into the fibrous sheet material. Otherwise, the sinkers of the embodiment of FIGS. 17 to 19 correspond to the sinker of the embodiment of FIGS. 14 to 16, and have projecting lugs 44 for pressing the engaged fibers into the open hooks of the needle.

The sinkers may be made of wire, or stamped from a metal sheet and mounted individually in holder means 13, which may be made of metal or a plastic material. It is also possible to form the sinkers and the holder as a comb consisting of a plastic material.

A fibrous sheet material 26, which may be formed of loose fibers, fleeces of different texture and composition, of oriented or non-oriented fibers, is fed and transported by conveyor 3 between tables 4 and 5, closing bits 27 and knock-over bits 25 and towards a take-up reel on top of the machine, not shown.

The hook portions 19 of the needles pierces the material moving from one side to the other side of the same to the illustrated position, and simultaneously sinkers 14 penetrate into the material 26 and press individual fibers of the material toward the needle hook portions 19. During the return stroke of hook portions 19, when the open hooks pass through material 26, the required amount of fibers for forming loops 15 is pressed into the same. The pointed tips 42 or 45 of sinkers 14 penetrate first to a certain depth of material 26 a certain distance from the hook portions 19, and then move upwards for pressing the engaged fibers into the open hooks. The size of the sinkers and of lugs 44 is selected so that the part of the fibrous material which is pressed into the hooks is sufficient for forming a loop.

During the continued movement of hook portions 19, latches 20 are operated to move in a slot of the hook portions to a position closing the hooks whereby the caught fibers can be drawn through the material to form new loops while the old loops are knocked over. Due to the movement of the sheet material 26 by conveyor means 3, successive portions of the material are pierced and reinforced by chain loops 15.

Due to the mounting of needles 19, 20 in parallel juxtaposed rows, a greater number of stitches can be made in each column of loops, and at the same time, it is prevented that the fibers are simultaneously caught by more than one needle which would cause breakage.

According to the required density of the stitches in each column, a suitable spacing between needles 19, 20 is provided, depending on the length of the fibers laid crosswise in material 26.

The distance between the individual rows of needles and sinkers must be such that the same amount of fibers is pressed into the hooks of the needles in the lower and upper rows as required for producing uniform loops.

For the production of textile fabrics of different thickness and composition, it is necessary to differently adjust sinkers 14 with respect to needles 19, 20 in order to press the necessary and desired amount of fibers into the hooks.

This is made possible by providing adjusting means 11 for adjusting the bed 12 of sinkers 14 relative to the needles. Due to the adjusting means, the sinkers can be placed in positions in which they penetrate into the material shorter or greater distances from the path of needles 19, 20, as well as from the contact surface of closing table 4 which determines the position of the penetrated surface of the material. In this manner, the depth of penetration of the material by the sinkers can be adjusted. Since the hooks of the needles fit into grooves 40 of the sinkers, the sinkers can closely approach the hook without damaging the same.

For processing thin sheets of material, the modified sinker described with reference to FIGS. 17 to 19 is preferred. Since the penetrating tip of the sinker is fork-shaped and provided with two pointed prongs 45, the projecting lugs 44 can be disposed spaced a short distance from the penetrating projecting tips 43 which helps to press the fibers of material 26 into the hook of the needle.

The apparatus of the present invention permits the manufacture of a new type of fabric which uses no spun yarn or thread on a machine which is substantially a warp knitting machine which operates efficiently and requires very little attendance.

It will be understood that each of the elements described above, or two or more together, may also find a useful application in other types of quilting machines differing from the types described above.

While the invention has been illustrated and described as embodied in an apparatus for reinforcing fibrous material by chain loops formed of fibers of the material, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for reinforcing a fibrous material, comprising, in combination, supporting means for supporting a fibrous material having two sides; sinker means operable on one side of the material for engaging and displacing parts of said material on said one side of the material; and needle means operable for penetrating said material and being movable between a position located on said one side for receiving said parts of said material from said sinker means and another position located on the other side of the material, said needle means driving said parts through said material for reinforcing the same.

2. An apparatus according to claim 1, including transporting means for transporting said fibrous material along a path; wherein said needle means are reciprocable in a direction transverse to said path and have hooks passing from one side of said material to the other side and back; wherein said sinker means are located on said one side and are movable toward and away from said material and said needle means for first engaging said parts of said material and for then pressing the engaged parts into said hooks of said needle means when the same are located on said one side so that the same draw said parts from said one side to said other side.

3. An apparatus according to claim 1, wherein said needle means comprise at least one row of needles, each needle including a hook portion and a latch portion operable for closing and opening said hook portion; and means for operating said latch portions to open said hook portions when the same are located on said one side of the material.

4. An apparatus for reinforcing a fibrous material, comprising supporting means for supporting a fibrous material; sinker means operable for engaging and displacing parts of said material, said sinker means being movable first toward said material in one direction and then toward said needle means in another direction; and needle means operable for penetrating said material and being movable between a position for receiving said parts of said material from said sinker means and another position for driving said parts through said material for reinforcing the same.

5. An apparatus according to claim 4, including transporting means for transporting said fibrous material along a path; wherein said needle means comprise at least one row of needles reciprocable in a direction transverse to said path and having hooks passing from one side of said material to the other side in a forward stroke and back in a return stroke; wherein said sinker means comprise at least one row of sinkers located on said other side, said sinkers respectively cooperating with said needles and being movable on the other side of said material first toward said material for engaging said parts of said material and then toward said needles for pressing the engaged parts into said hooks of said needles, respectively, so that said needles draw said parts during said return stroke from said other side to said one side to reinforce said material.

6. An apparatus according to claim 5, wherein each of said needles includes a hook portion having said hook and a latch portion operable for closing and opening said hook; and including operating means for said sinkers, operating the same in a predetermined sequence with said latch portions so that said hooks are open when said sinkers press engaged parts of the material into said hooks, and are closed when said hooks are located on said one side so as to form chain loops of said parts passing through and reinforcing said material.

7. An apparatus according to claim 4, wherein said sinker means comprise at least one row of sinkers, and said needle means comprise at least one row of needles having hooks, each of said sinkers having a free end portion for engaging said material and formed with a groove for receiving said hook of a corresponding needle.

8. An apparatus according to claim 1, wherein said sinker means comprise at least one row of sinkers, and said needle means comprise at least one row of needles having hooks, each of said sinkers having a free end portion for engaging said material and formed with a groove for receiving said hook of a corresponding needle, each sinker having a pair of walls bounding said groove and adapted to be located on opposite sides of a hook, said walls having projecting lugs for pressing said parts of said material into said hook of the respective needle.

9. An apparatus according to claim 8, wherein said walls have pointed end portions projecting beyond the end of said groove and forming a pair of prongs for engaging said material.

10. An apparatus according to claim 4, wherein said needle means are located on one side, and said sinker means are located on the other side of said material; and including operating means connected with said sinker means for operating the same in a predetermined sequence of movements so that said parts of said material are supplied by said sinker means to said needle means on said other side, and are drawn by said needle means to said one side.

11. An apparatus according to claim 4, wherein said needle means include a plurality of parallel rows of needles, the needles of said rows being staggered and offset relative to each other; and wherein said sinker means include a plurality of parallel rows of sinkers, the sinkers of said rows being offset and staggered relative to each other in the same pattern as said needles and disposed so that said sinkers and needles respectively cooperate with each other.

12. An apparatus according to claim 4, including transporting means for transporting said fibrous material along a path; wherein said needle means are movable in a direction transverse to said path and have end portions movable from one side to the other side of said material, said end portions being spaced along said path from said sinker means; and including operating means for moving said sinker means toward said material for engaging said parts and then towards said end portions for supplying said parts to the same.

13. An apparatus according to claim 4, including transporting means for transporting said fibrous material along a path; wherein said needle means are movable in a direction transverse to said path and have end portions movable from one side to the other side of said material, said end portions being spaced along said path from said sinker means; and including operating means for moving said sinker means toward said material for engaging said parts and then toward said end portions for supplying said parts to the same, said operating means including a shaft mounted for rocking movement, holder means for said sinker means adjustably mounted on said shaft; and drive means for rocking said shaft so that said sinker means move along a circular path having its center in the axis of said shaft.

14. An apparatus according to claim 4, including transporting means for transporting said fibrous material along a path; wherein said needle means are movable in a direction transverse to said path and have end portions movable from one side to the other side of said material, said end portions being spaced along said path from said sinker means; and including operating means for moving said sinker means toward said material for engaging said parts and then towards said end portions for supplying said parts to the same, said operating means including a shaft mounted for rocking movement, drive means for rocking said shaft, lever means connected to said shaft to be rocked by the same about a first axis, said lever means including a movable cam follower rocking with said lever means in one direction, and a cam secured to said shaft and cooperating with said cam follower means for moving the same transverse to said one direction so that said cam follower performs a composite motion; and including holder means for said sinker means adjustably mounted on said cam follower so that said sinker means move with said holder means and cam follower in a composite motion first into said material to engage said parts and then toward said needle means for supplying said parts to the same.

15. An apparatus according to claim 4, including transporting means for transporting said fibrous material along a path; and a closing table and a knock-over table located on opposite sides of said material for guiding the same along said path and having spaced bits for the passage of said sinkers and needles, respectively; wherein said needle means comprise at least one row of needles reciprocable in a direction transverse to said path and having hooks passing from one side of said material to the other side in a forward stroke and back in a return stroke; wherein said sinker means comprise at least one row of sinkers located on said other side, said sinkers respectively cooperating with said needles, each sinker having a free end portion formed with a groove for receiving at least part of said hook of a corresponding needle and being movable on the other side of said material first toward said material for engaging said parts of said material and then toward said needles for pressing the engaged parts into said hooks of said needles, respectively; wherein each of said needles includes a hook portion having said hook and a latch portion operable for closing and opening said hook; and including operating means for said sinkers, operating the same in a predetermined sequence with said latch portions so that said hooks are open when said sinkers press engaged parts of the material into said hooks, and are closed when said hooks are located on said one side so as to form chain loops of said parts passing through the reinforcing said material.

16. An apparatus according to claim 15, wherein each sinker has a pair of walls bounding said groove and having projecting lugs for pressing said parts of said material into said hook of the respective needle, and at least one pointed end portion projecting beyond the end of said groove for penetrating into said material.

17. An apparatus for the production of reinforced sheets of fibrous fleece material, comprising, in combination, needle means including needles arranged in rows and having oval cross sections; conveyor means for the fleece material; a closing table and knock-over table defining a path for the conveyed material; a shaft; pressing sinkers having engaging portions with grooves and being arranged in at least one row in planes passing through the longer axis of the over cross-sections of said needles, said sinkers being turned toward said needles with the points thereof, and adjustably arranged with respect to a plane passing through their paths and to the surfaces of said tables and to said material, said sinkers being mounted on said shaft for swinging movement so that said engaging portions of said sinkers penetrate into said material and move toward said needles.

18. An apparatus according to claim 17, comprising a bed for said sinkers, and a mechanism adjustably supporting said bed, said mechanism including a lever and an angular cam follower arm connected with said shaft for rocking movement; a shaped cam member carried by said shaft, said cam follower arm following the contour of said shaped cam member, and supporting said bed and sinkers.

19. An apparatus according to claim 17, wherein said groove of each sinker is open at both ends and is bounded by walls, said walls forming lugs and at least one pointed tip in the front part of said groove for pressing the material into said needles.

20. An apparatus according to claim 19, wherein said needles have hooks; and wherein said grooves have a depth between a quarter of the height and the entire height of said hooks for receiving the same.

References Cited by the Examiner

UNITED STATES PATENTS

| 1,314,565 | 9/1919 | Billington | 28—72.2 |
| 2,672,674 | 3/1954 | Shon | 66—85 |
| 3,079,778 | 3/1963 | Kubelka et al. | 66—85 |

FOREIGN PATENTS

| 226,348 | 3/1963 | Austria. |
| 853,867 | 12/1939 | France. |
| 900,056 | 12/1953 | Germany. |
| 878,248 | 9/1961 | Great Britain. |

MERVIN STEIN, *Primary Examiner.*

L. K. RIMRODT, *Assistant Examiner.*